United States Patent
Civera (10) Patent No.: US 12,552,328 B2
(45) Date of Patent: Feb. 17, 2026

(54) CAR PROVIDED WITH FRONT PILLAR COVERING ELEMENTS

(71) Applicant: FERRARI S.P.A., Modena (IT)

(72) Inventor: Stefano Civera, Modena (IT)

(73) Assignee: FERRARI S.P.A., Modena (IT)

( * ) Notice: Subject to any disclaimer, the term of this patent is extended or adjusted under 35 U.S.C. 154(b) by 514 days.

(21) Appl. No.: 18/159,563

(22) Filed: Jan. 25, 2023

(65) Prior Publication Data

US 2023/0249751 A1     Aug. 10, 2023

(30) Foreign Application Priority Data

Feb. 10, 2022  (IT) .................. 102022000002387

(51) Int. Cl.
*B60R 13/04*     (2006.01)
*B62D 25/04*     (2006.01)

(52) U.S. Cl.
CPC .............. *B60R 13/04* (2013.01); *B62D 25/04* (2013.01)

(58) Field of Classification Search
CPC ........ B60R 13/025; B60R 13/04; B62D 25/04
USPC .......................................... 296/1.08, 193.06
See application file for complete search history.

(56) References Cited

U.S. PATENT DOCUMENTS 9,096,270 B2 * 8/2015 Kojima .................. B62D 25/04

FOREIGN PATENT DOCUMENTS

| DE | 202017103747 U1 | 8/2017 |
| DE | 102016218676 A1 | 3/2018 |
| EP | 1325827 A1 | 7/2023 |
| GB | 2566302 A | 3/2019 |
| JP | 2017217979 A | 12/2017 |
| JP | 2018069785 A * | 5/2018 |
| WO | 2005102781 A1 | 11/2005 |
| WO | 2020022020 A1 | 1/2020 |

OTHER PUBLICATIONS

English translation of WO 2020/022020; retrieved via Patent-Translate located at www.epo.org. (Year: 2025).*
Italian Search Report for Application No. 102022000002387; Filing Date—Feb. 10, 2022; Date of Mailing—Sep. 23, 2022, 7 pages.
European Search Report for European Patent Application No. 23155720.8, Date of Mailing May 31, 2023, 6 pages.

* cited by examiner

Primary Examiner — Jason S Daniels
(74) Attorney, Agent, or Firm — CANTOR COLBURN LLP (57) ABSTRACT

A car having: two front wheels; two rear wheels; a passenger compartment, which is arranged between the front wheels and the rear wheels; a body comprising: a windshield, which delimits the passenger compartment at the front, a roof, which covers the passenger compartment at the top, and two front pillars, each delimiting the windshield on the sides; and two covering elements, each of which covers a corresponding front pillar on the outside, has an outer cover visible from the outside of the car and has a support structure, which is glued to the outer cover and is firmly bound to the corresponding front pillar.

15 Claims, 10 Drawing Sheets

CAR PROVIDED WITH FRONT PILLAR COVERING ELEMENTS

CROSS-REFERENCE TO RELATED APPLICATIONS

This patent application claims priority from Italian patent application no. 102022000002387 filed on Feb. 10, 2022, the entire disclosure of which is incorporated herein by reference.

TECHNICAL FIELD

This invention relates to a car provided with front pillar covering elements.

PRIOR ART

A car comprises a body covering a passenger compartment that is arranged between the front wheels and the rear wheels and is provided with (at least) two seats each designed to receive a corresponding occupant; the body comprises, among other things, a front bumper, a front hood, a windshield delimiting the passenger compartment at the front, a roof covering the passenger compartment above, a rear window delimiting the passenger compartment at the back, a rear hood, and a rear bumper. On the side, the body has two sides that are provided with at least two corresponding doors, each of which is equipped with a corresponding window that can be opened. The body also comprises two front pillars, each of which delimits the windshield to the side, originates from the waistline (i.e., from the upper outer limit of the closed area from which the glass surfaces extend up high), and ends in the roof.

In almost all cars, the two front pillars have the same colour as the rest of the body (or at least as part of the rest of the body in the case of two-coloured bodies). For aesthetic reasons, it has been necessary to have just the two front pillars of a different colour (for example opaque black instead of shiny black) from the rest of the body so as to "disappear" (i.e., to be less noticed) in the middle of glass surfaces (in fact, each front pillar separates the windshield from a corresponding side window).

To obtain the two front pillars with a different colour to the rest of the body, the most widely known solution is to double paint the body to apply to the front pillars a different paint to the rest of the body; in any case, this solution is particularly costly especially when the production volumes are significant (and, thus, the painting operation is highly automated).

To obtain the two front pillars with a different colour from the rest of the body, it was proposed to cover the front pillars with a coloured adhesive film; in any case, this solution, though highly advantageous economically, obtains an acceptable aesthetic result, but not an excellent one.

The patent applications WO2020022020A1, JP2017217979A and GB2566302A describe a car having two covering elements, each of which covers a corresponding front pillar on the outside, comprises an outer cover visible from outside the car, and comprises a support structure that is glued to the outer cover and is firmly bound to the corresponding front pillar.

DESCRIPTION OF THE INVENTION

The purpose of this invention is to provide a car provided with front pillar covering elements and without the drawbacks described above.

According to this invention, a car provided with front pillar covering elements, according to that set forth in the appended claims, is provided.

The claims describe preferred embodiments of this invention forming an integral part of this description.

BRIEF DESCRIPTION OF THE DRAWINGS

This invention will now be described with reference to the attached drawings that illustrate a non-limiting embodiment thereof.

PREFERRED EMBODIMENTS OF THE INVENTION

Figure 1:
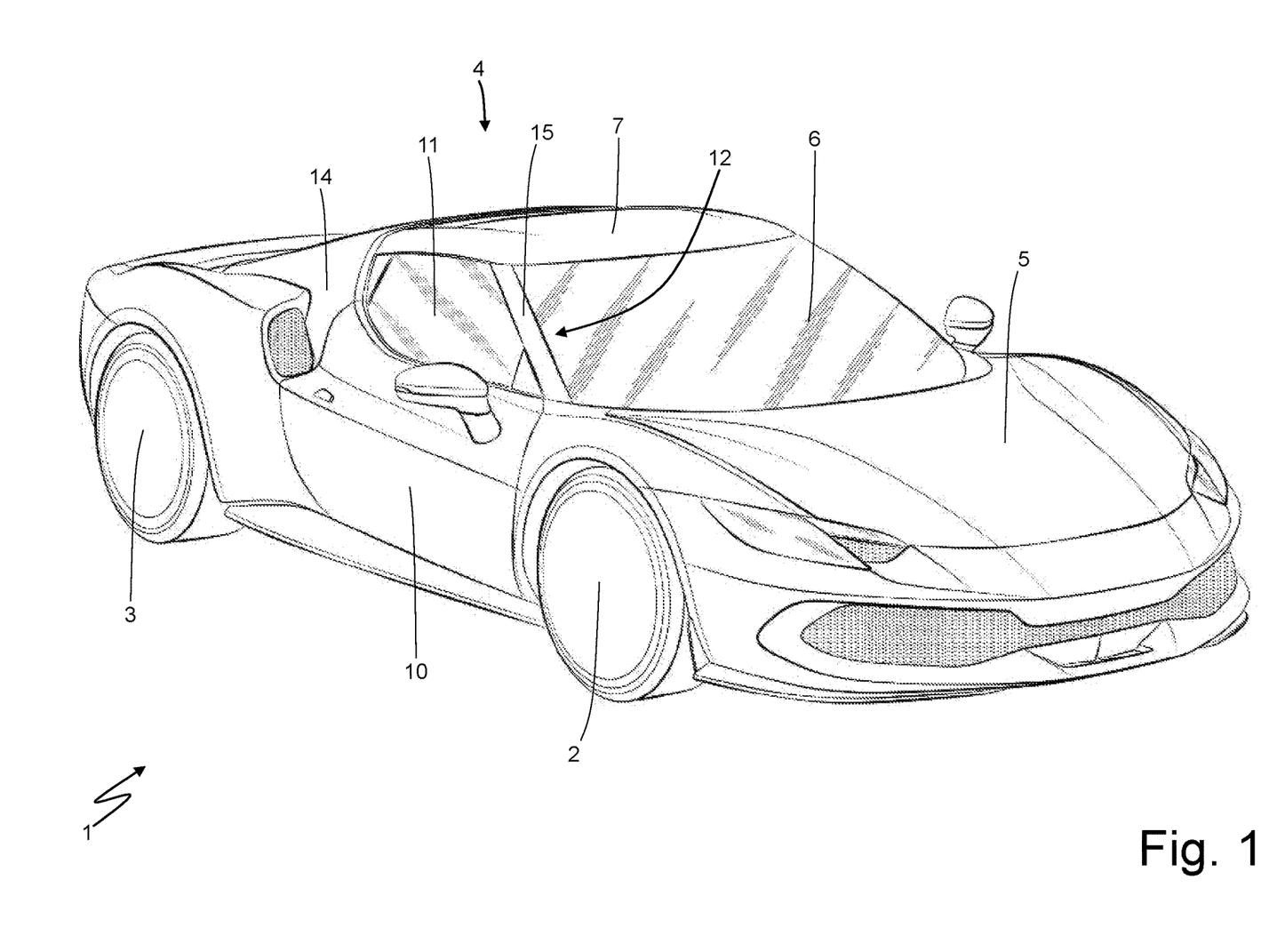
FIG. 1 is a front perspective view of a car produced according to this invention.

In FIG. 1, the reference number 1 indicates, as a whole, a car comprising a frame, which supports a pair of driven front wheels 2 (i.e., not driving) and a pair of driving rear wheels 3. In a central position, there is an internal combustion engine, which produces torque that is transmitted to the rear driving wheels 3 via a transmission.

The frame is covered by a body 4 that covers a passenger compartment, which is arranged between the front wheels 2 and the rear wheels 3 and is provided with (at least) two seats each designed to receive a corresponding occupant; i.e., in the passenger compartment, there is always a driver to whom you may add (at least) one passenger (whose presence is, obviously, optional).

The body 4 comprises, among other things, a front bumper, a front hood 5 (covering a front luggage compartment), a windshield 6 delimiting the passenger compartment at the front, a roof 7 covering the passenger compartment above, a rear window 8 delimiting the passenger compartment at the back, a rear hood 9 (covering a rear engine compartment), and a rear bumper. On the side, the body 4 has two sides that are provided with corresponding doors 10, each of which is equipped with a corresponding window 11 that can be opened. The body also 4 comprises two front pillars 12, each of which delimits the windshield 6 to the side, originates from the waistline (i.e., from the upper outer limit of the closed area from which the glass surfaces extend up high), and ends in the roof 7.

Figure 2:
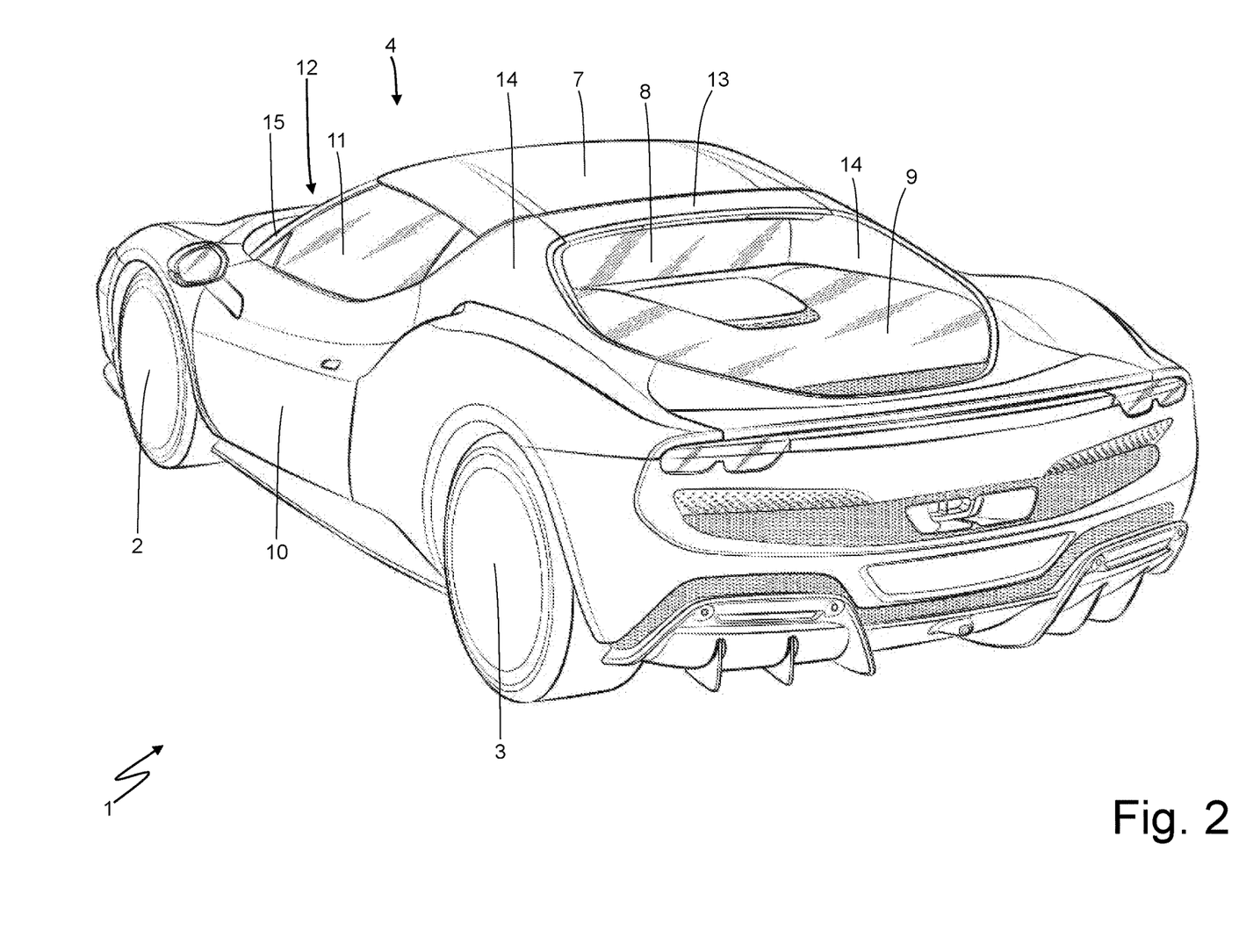
FIG. 2 is a rear perspective view of the car in FIG. 1.
Figure 3:
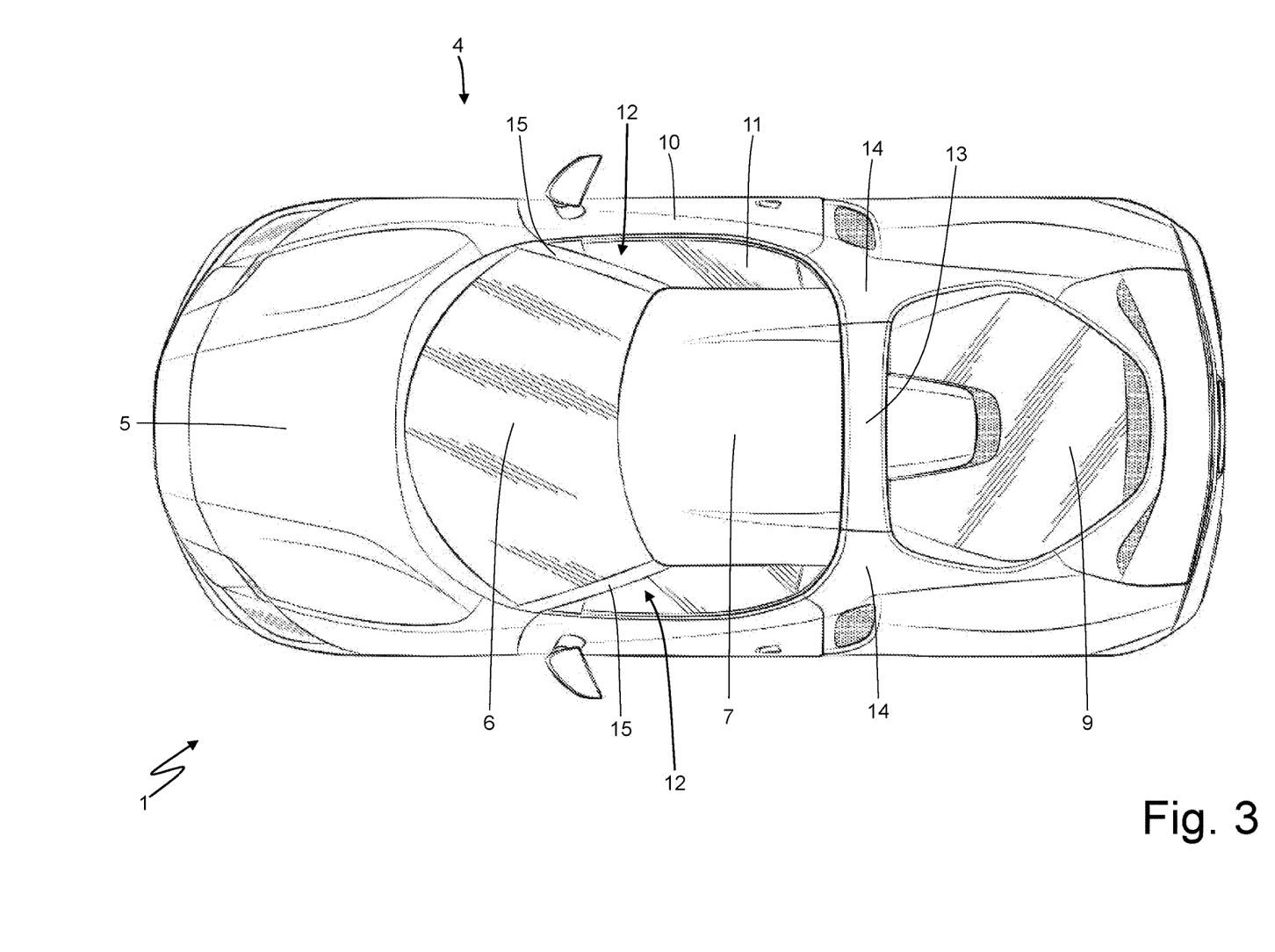
FIG. 3 is a plan view of the car in FIG. 1.
Figure 4:
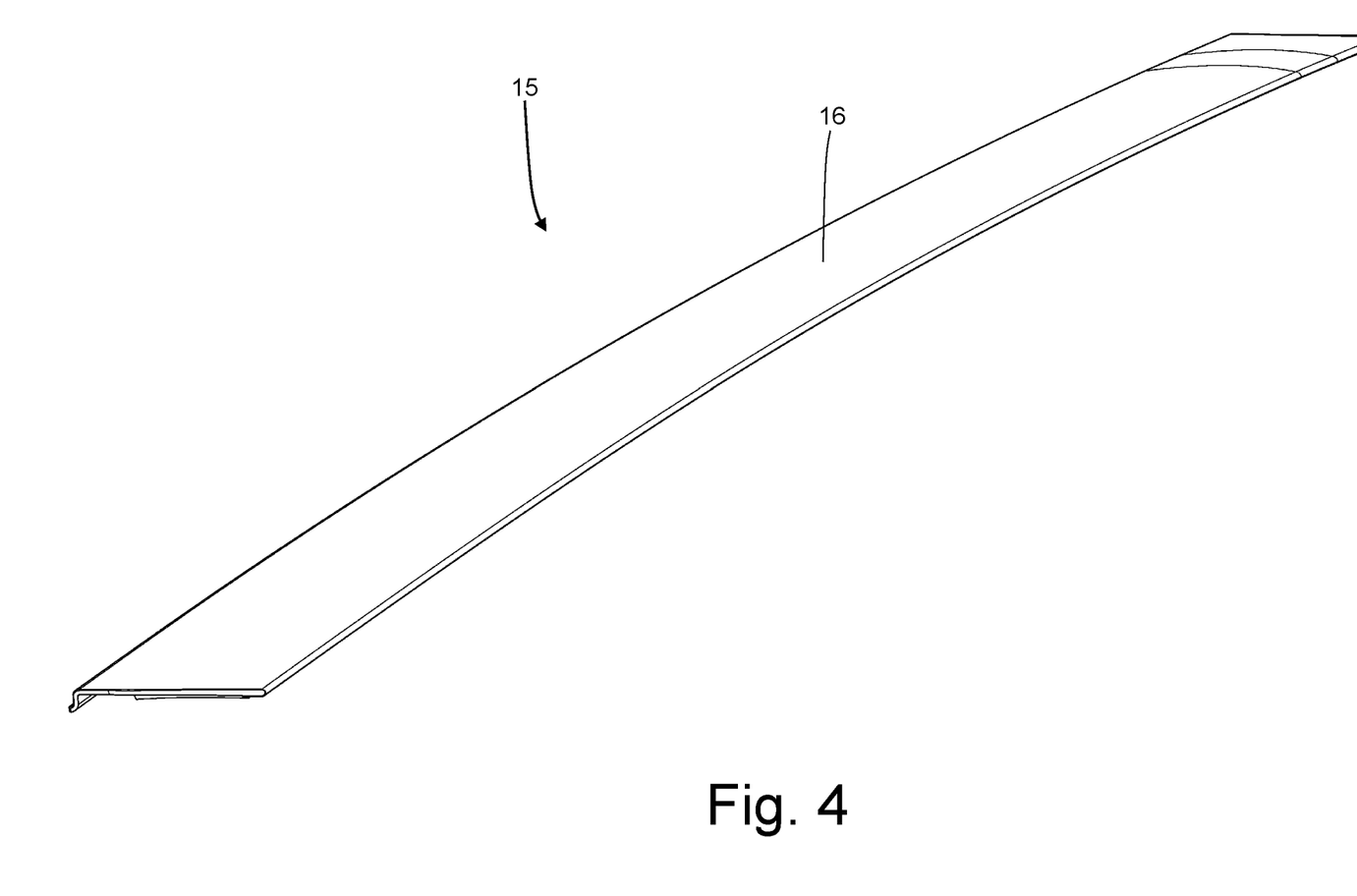
FIGS. 4 and 5 are two different perspective views of the outside of a front pillar covering element of the car in FIG. 1.
Figure 5:
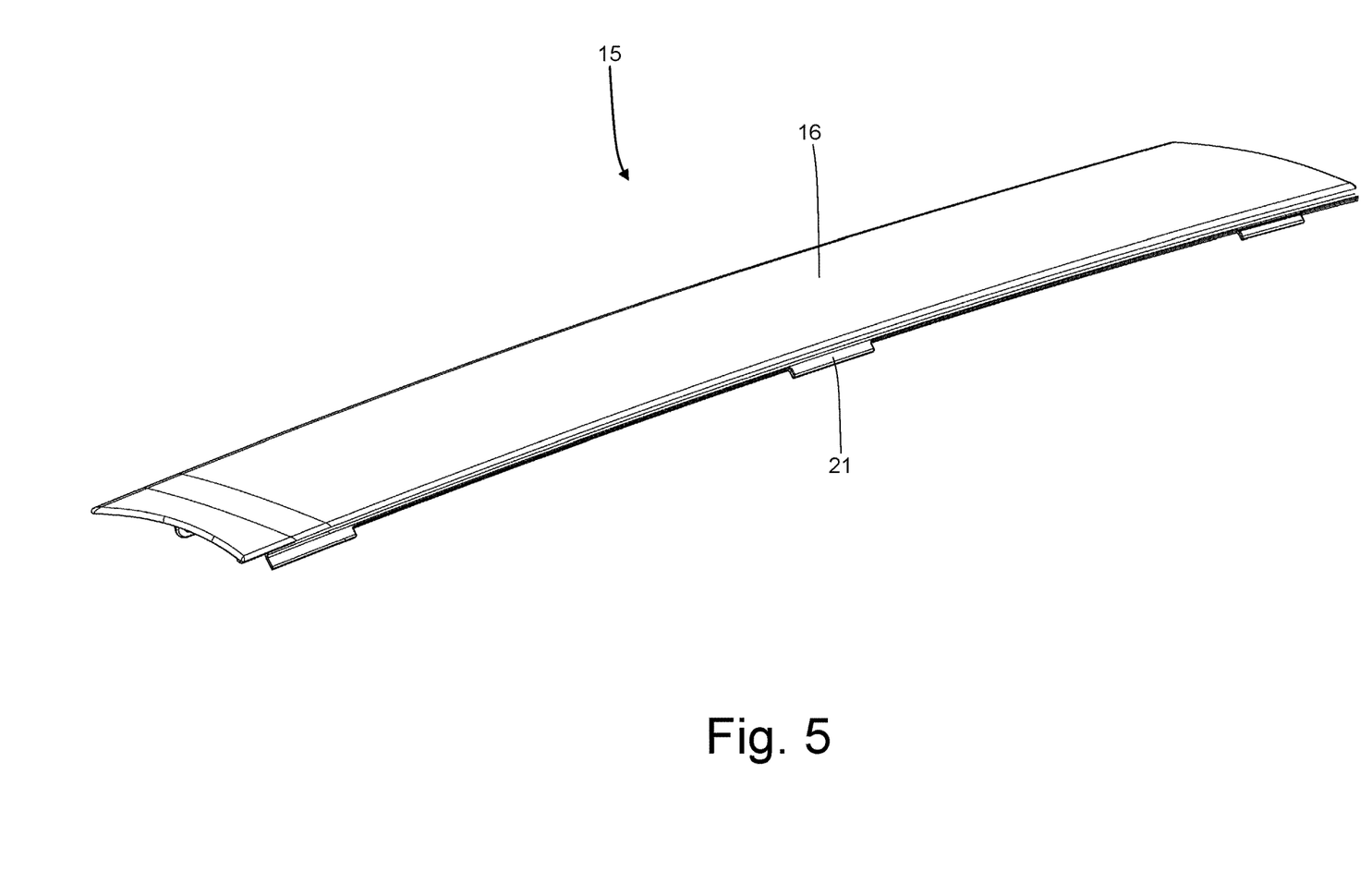

According to what is better illustrated in FIGS. 2 and 3, the body 4 comprises a rear spoiler 13 that constitutes a seamless extension of the roof 7 towards the rear of the car; i.e., the rear spoiler 13 is arranged behind the roof 7 and is seamlessly connected to the roof 7 (i.e., without appreciable steps or empty spaces).

The front pillars 12 have the function of supporting (containing) the windshield 6 to the side and supporting the roof 7 at the front, while the rear pillars 14 have the function of supporting (containing) the rear window 8 to the side and supporting the roof 7 at the rear. In other words, the roof 7 has four support points: two support points defined by the front pillars 12 and two support points defined by the rear pillars 14. The two front pillars 12 may directly support the roof 7 (or may be directly connected to the roof 7) or may indirectly support the roof 7 (or may end in a horizontal crossbar on which the roof 7 rests).

According to what is illustrated in FIGS. 1, 2, and 3, the car 1 comprises two covering elements 15 of the front pillars 12; i.e., each covering element 15 covers and hides from the outside the corresponding front pillar 12 so that the front pillar 12 cannot be seen from the outside.

According to what is illustrated in FIGS. 4-8, each covering element 15 covers a corresponding front pillar 12 on the outside, comprises an outer cover 16 visible from the outside of the car 1, and comprises a support structure 17, which is glued to the outer cover 16 and is firmly attached to the corresponding front pillar 12. In other words, in each covering element 15, only the support structure 17 is directly fixed to the corresponding front pillar 12 while the covering element 15 is glued to the support structure 17.

Figure 6:
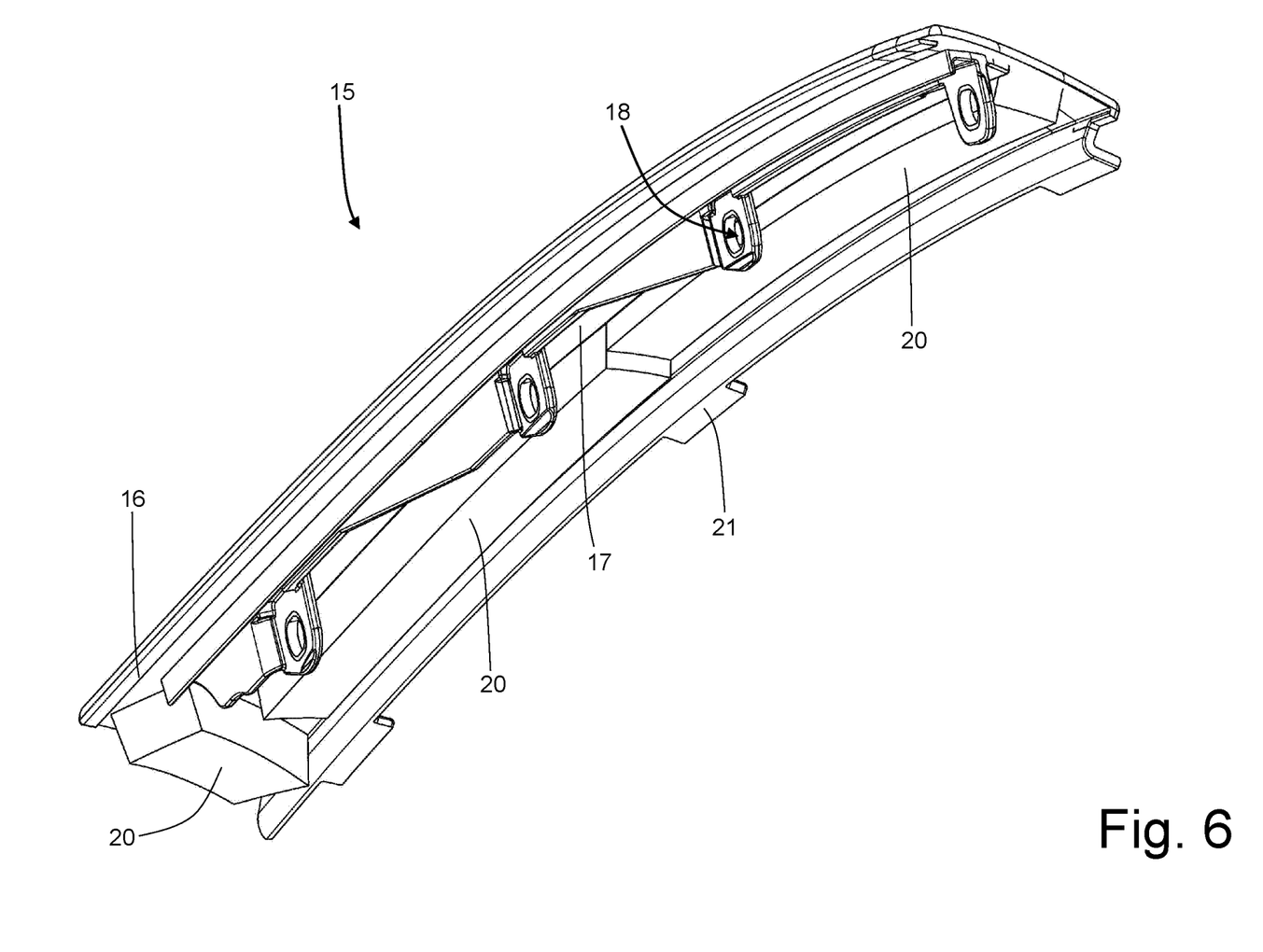
FIG. 6 is a perspective view from the inside of the covering element in FIGS. 4 and 5.
Figure 7:
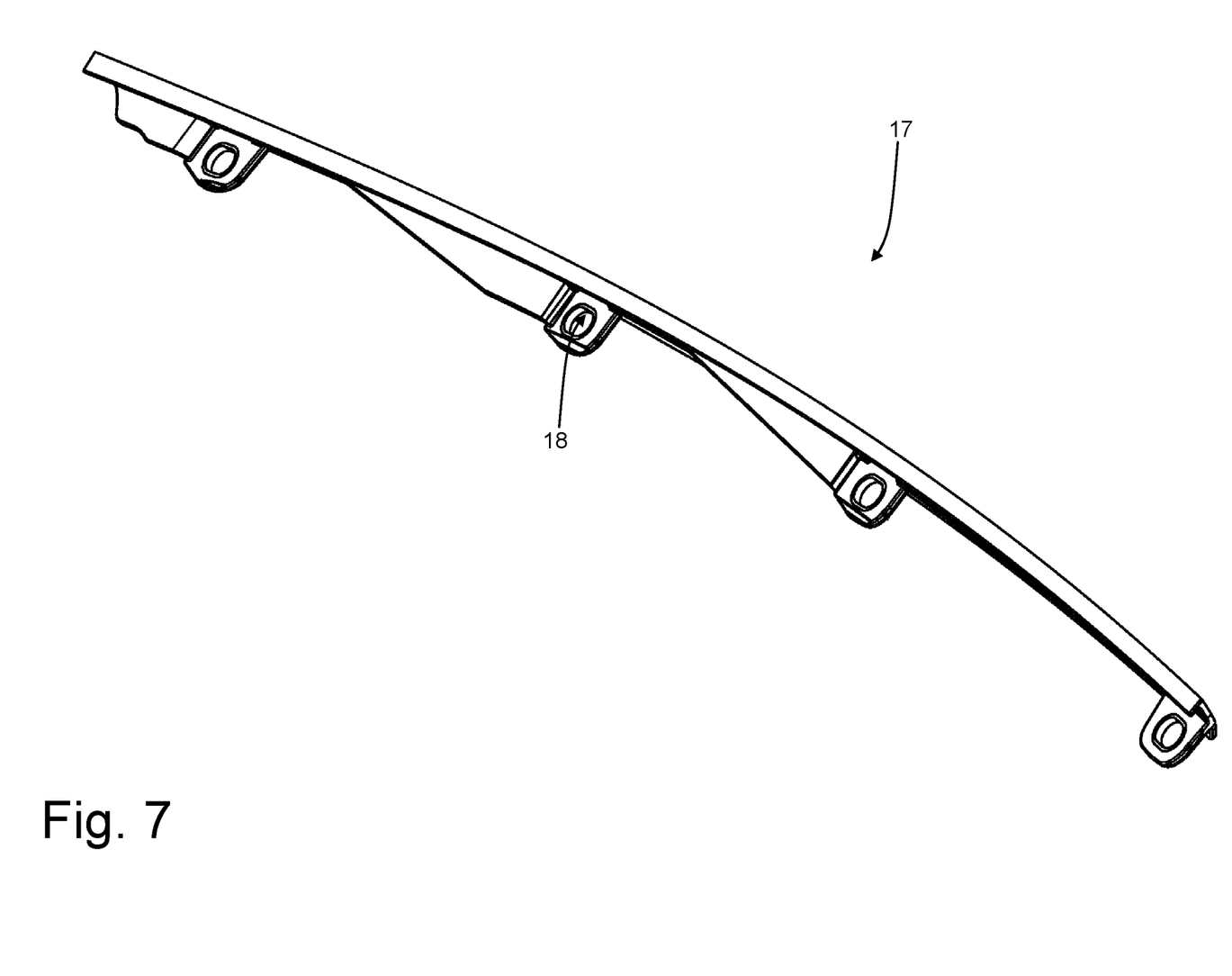
FIG. 7 is a perspective view of a support structure of the covering element in FIGS. 4 and 5.
Figure 8:
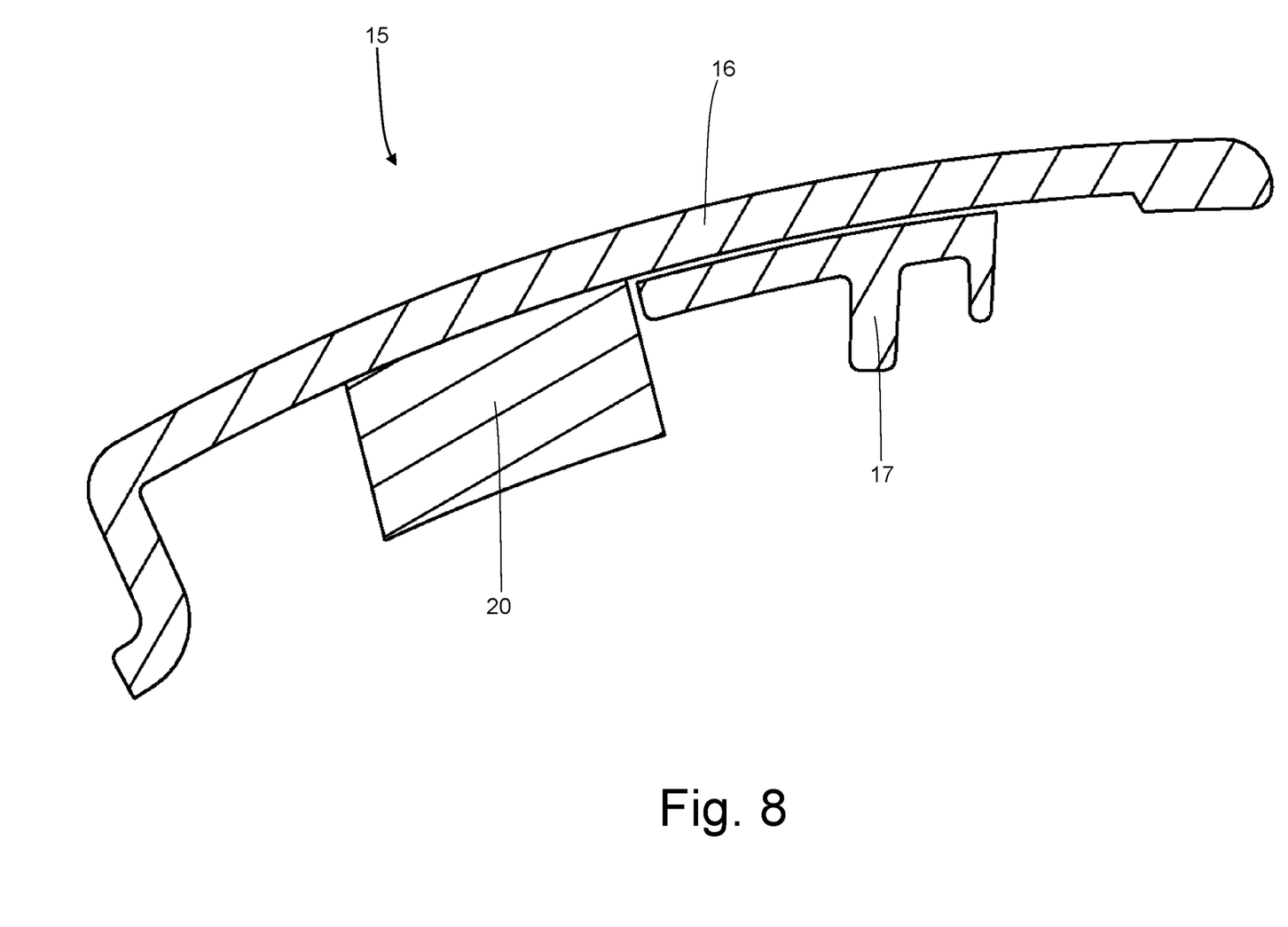
FIG. 8 is a cross-section view of the covering element in FIGS. 4 and 5.

According to what is illustrated in FIGS. 6 and 7, the support structure 17 of each covering element 15 comprises multiple eyelets 18 (in particular, four eyelets 18), each of which is engaged by a screw 19 (illustrated in FIG. 9), which is integral to the corresponding front pillar 12. According to a preferred embodiment, each screw 19 engages a corresponding nut to lock the corresponding front pillar 12; alternatively, the nut is attached (welded) to the corresponding front pillar 12, or the corresponding front pillar 12 has a threaded hole that is engaged by the screw 19. According to a preferred embodiment, at each screw 19 calibrated compensation shims with variable dimensions may be inserted that make it possible to compensate for construction tolerances and, therefore, make it possible to confer the desired position to the outer cover 16.

According to a preferred embodiment illustrated in FIGS. 6-10, each covering element 15 comprises three inserts 20 (preferably with the shape of a parallelepiped), each of which is glued to the outer cover 16 next to the support structure 17 and consists of an elastically compressible plastic material. In each covering element 15, the inserts 20 are compressed and elastically deformed between the outer cover 16 and the corresponding front pillar 12 to seal any openings existing between the outer cover 16 and the corresponding front pillar 12; i.e., the inserts 20 are "filling" inserts that can be adapted that seal any openings between the outer cover 16 and the corresponding front pillar 12. In this way, the presence of the inserts 20 makes it possible to insulate the front pillar 12 (thus, the passenger compartment) from infiltrations of air and humidity and from the passage of external noise.

Figure 9:
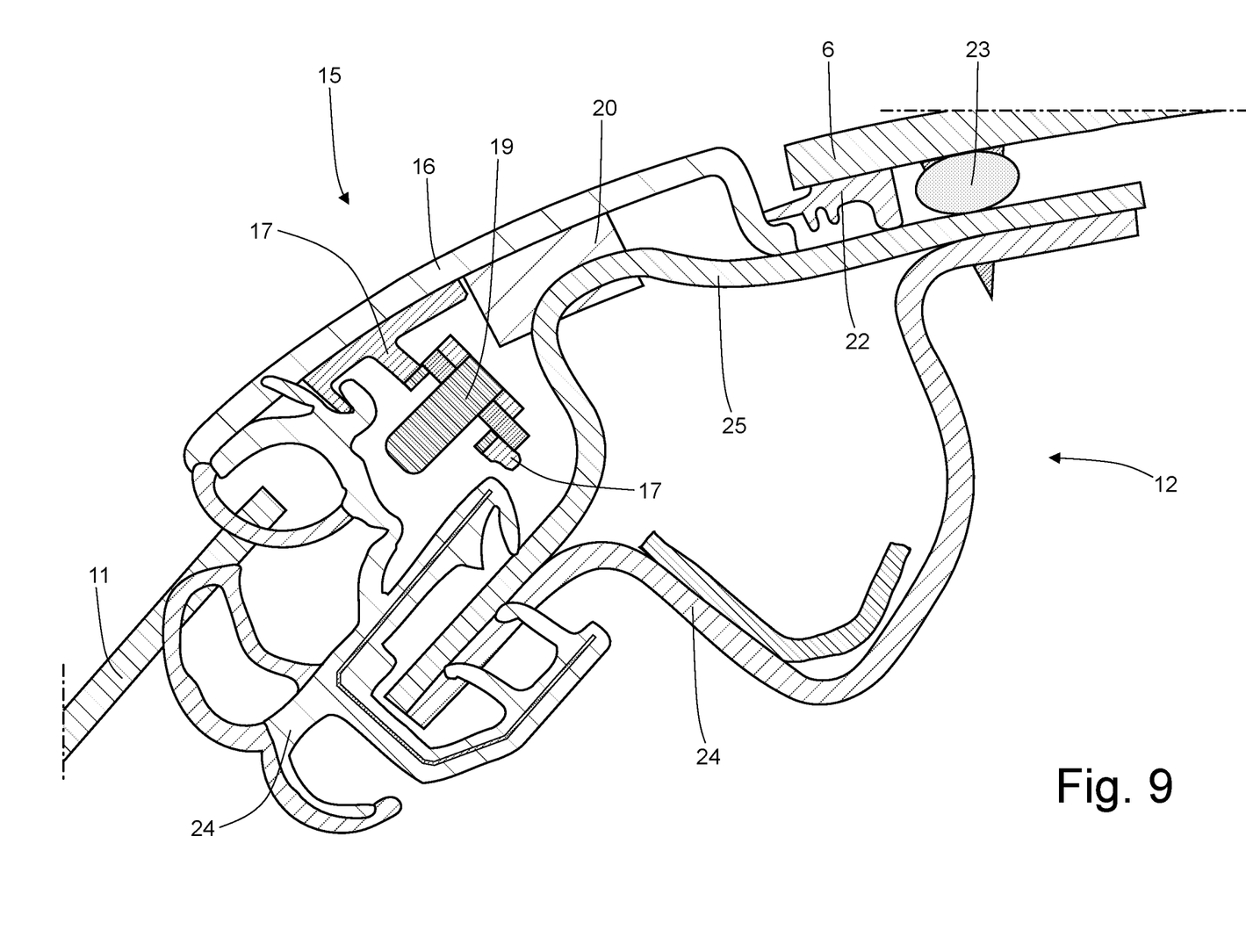
FIGS. 9 and 10 are two different cross-section views of the covering element of FIGS. 4 and 5 mounted on the car in FIG. 1.
Figure 10:
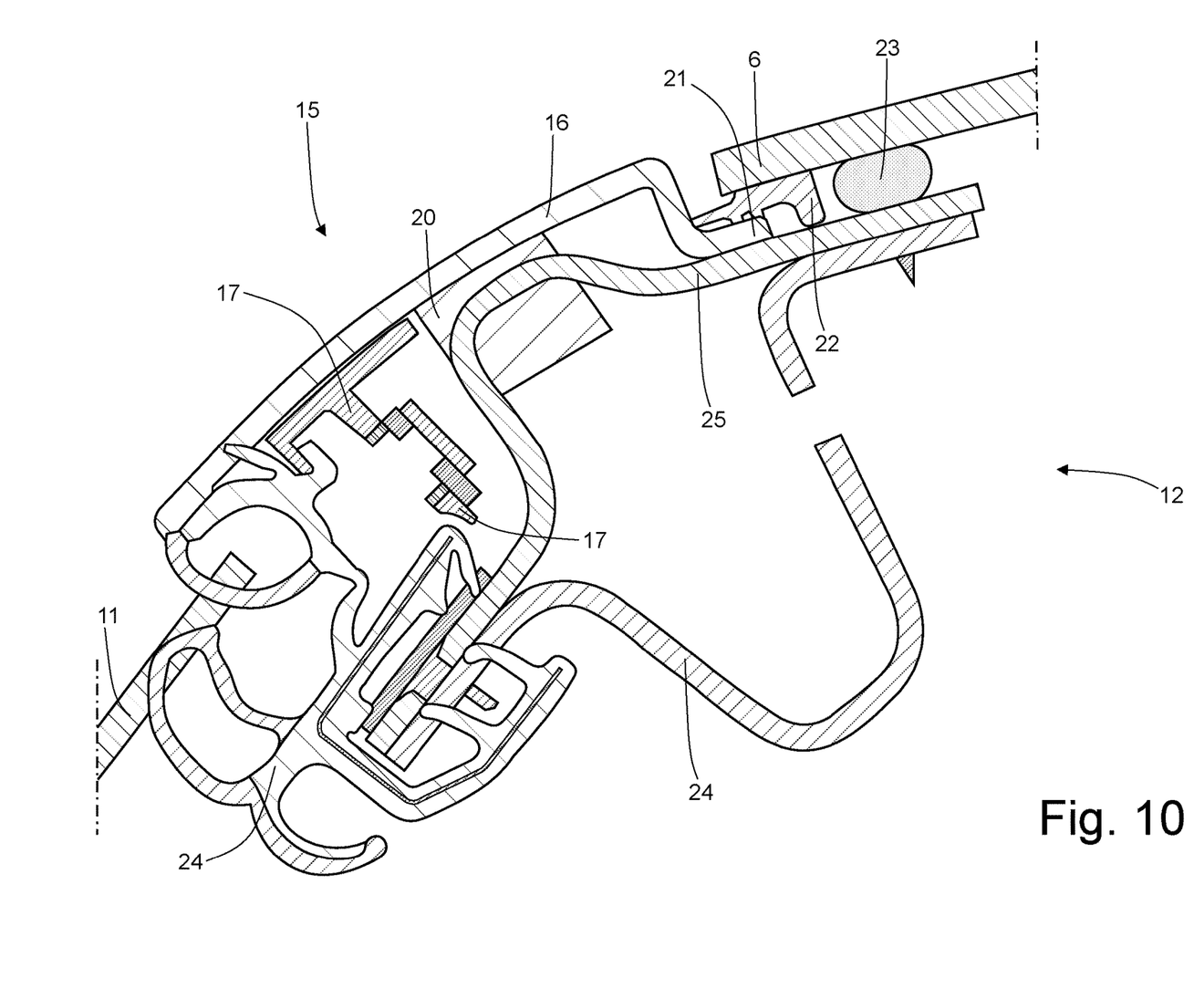

The outer cover 16 of each covering element 15 has a series of projections 21 (teeth) that are arranged below an edge of the windshield 6; in particular, the outer cover 16 of each covering element 15 has three projections 21 arranged at a certain distance from each other. In other words, through the projections 21 each covering element 15 is slotted on one side below an edge of the windshield 6. FIG. 9 illustrates a cross section made outside the projections 21 (that cannot be seen in FIG. 9) while FIG. 10 illustrates a cross section made at one projection 21 (that is, thus, visible in FIG. 10). In particular, in FIGS. 9 and 10, a gasket 22 of the windshield 6 and an adhesive 23 that glues the windshield 6 to the corresponding front pillar 12 are also visible. There is one seal 22, which is closed in a ring on itself and completely surrounds the windshield 6 on all sides. The adhesive 23 that is placed between the windshield 6 and each front pillar 12 and is arranged more inside the gasket 22, i.e., is arranged on the opposite side of the covering element 15 compared to the gasket 22.

In other words, a gasket 22 is provided that is placed between the windshield 6 and each front pillar 12 and is shaped so as to create a space configured to receive the projections 21 of the corresponding outer cover 16. In particular, the gasket 22 has, in cross section, an "L" shape having a short side that connects the windshield 6 to each front pillar 12 and a long side that faces the outside of the windshield 6, is perpendicular to the short side, and delimits the space configured to receive the projections 21 of the corresponding outer cover 16.

The presence of the projections 21 that, projecting from the outer covers 16 of the covering elements 15 are slotted below the windshield 6, makes it possible both to ensure a firm mounting (i.e., without weaknesses) of the covering elements 15, and to disassemble (when necessary) the covering elements 15 in a relatively simple and quick way without running the risk of undesired breakages or chipping of components.

According to what is illustrated in FIGS. 9 and 10, a pair of gaskets 24 is provided, each of which is mounted (slotted) on a corresponding front pillar 12 and engages a corresponding side window 11. According to a preferred embodiment, each gasket 24 is fixed (slotted) to the support structure 17 as well of a corresponding covering element 15.

According to what is illustrated in FIGS. 9 and 10, each front pillar 12 is box-shaped (or empty inside) and consists of two sheets 24 and 25 joined together (typically via welding).

According to a preferred embodiment, the outer cover 16 of each covering element 15 is made of a moulded plastic material (and externally painted with the desired colour) while the support structure 17 of each covering element 15 is made of a metal material (alternatively, the support structure 17 of each covering element 15 could also be made of a moulded plastic material).

The embodiments described herein may be combined between them without departing from the scope of protection of this innovation.

Numerous advantages are achieved with the car 1 described above.

In the first place, the car 1 described above makes it possible to have a colour of the front pillars 12 different to that of the rest of the body 4.

In addition, the car 1 described above makes it possible to obtain a different colour of the front pillars 12 in a simple and cost-effective way (especially without requiring the body 4 to be painted twice) while managing to have an excellent aesthetic result (in certain ways better than what can be obtained by the paint applied to the metal body).

The covering elements 15 of the car 1 described above ensure a firm mounting (i.e., without weaknesses) and very precise (thanks to the possibility of also using compensation shims that make it possible to compensate for construction tolerances).

The covering elements 15 of the car 1 described above also ensure excellent hydraulic, pneumatic, and acoustic insulation towards the passenger compartment thanks to the presence of the elastically compressible inserts 20 glued to the outer cover 16.

REFERENCE NUMBER LIST FOR FIGURES 1 car
2 front wheels 3 rear wheels
4 body
5 front hood
6 windshield
7 roof
8 rear window
9 rear hood
10 doors
11 window
12 front pillars
13 rear spoiler
14 rear pillars
15 covering elements
16 outer cover
17 support structure
18 eyelets
19 screw
20 insert
21 projections
22 gasket
23 adhesive
24 sheet
25 sheet

The invention claimed is:

1. A car (1) comprising:
two front wheels (2);
two rear wheels (3);
a passenger compartment arranged between the front wheels (2) and the rear wheels (3);
a body (4) comprising: a windshield (6) delimiting the passenger compartment at the front, a roof (7) covering the passenger compartment at the top, and two front pillars (12), each delimiting the windshield (6) on the sides; and
two covering elements (15), each of which covers a corresponding front pillar (12) on the outside, comprises an outer cover (16) visible from the outside of the car (1) and comprises a support structure (17), which is glued to the outer cover (16) and is firmly constrained to the corresponding front pillar (12);
wherein the outer cover (16) of each covering element (15) has a series of projections (21) that are arranged below an edge of the windshield (6) and are arranged at a given distance from each other.

2. The car (1) according to claim 1, wherein the support structure (17) of each covering element (15) comprises a plurality of eyelets (18), each engaged by a screw (19), which is integral to the corresponding front pillar (12).

3. The car (1) according to claim 2, wherein each screw (19) engages a corresponding nut to lock the corresponding front pillar (12).

4. The car (1) according to claim 1, wherein each covering element (15) comprises at least one insert (20), which is glued to the outer cover (16) beside the support structure (17) and is made of an elastically compressible plastic material.

5. The car (1) according to claim 4, wherein, in each covering element (15), the insert (20) has the shape of a parallelepiped.

6. The car (1) according to claim 4, wherein, in each covering element (15), the insert (20) is elastically compressed and deformed between the outer cover (16) and the corresponding front pillar (12) in order to seal possible openings.

7. The car (1) according to claim 1, wherein the outer cover (16) of each covering element (15) has three projections (21) that are arranged below the edge of the windshield (6).

8. The car (1) according to claim 1, wherein through the projections (21) each covering element (15) is slotted in one side below the edge of the windshield (6).

9. The car (1) according to claim 1 and comprising a first gasket (22) that is placed between the windshield (6) and each front pillar (12) and is shaped to create a space configured to receive the projections (21) of the corresponding outer cover (16).

10. The car (1) according to claim 9, wherein the first gasket (22) has, in cross section, an "L" shape having a short side that connects the windshield (6) to each front pillar (12) and a long side that is perpendicular to the short side, faces the outside of the windshield (6) and delimits the space configured to receive the projections (21) of the corresponding outer cover (16).

11. The car according to claim 9, wherein the first seal (22) is single, is closed in a ring on itself and completely surrounds the windshield (6) on all sides.

12. The car (1) according to claim 9 and comprising an adhesive (23) that is placed between the windshield (6) and each front pillar (12) and is arranged more inside the first gasket (22), i.e., is arranged on the opposite side of the covering element (15) compared to the first gasket (22).

13. The car (1) according to claim 1 and comprising a pair of second gaskets (24), each of which is mounted on a corresponding front pillar (12) and engages a corresponding side window (11).

14. The car (1) according to claim 13, wherein each second gasket (24) is also fixed to the support structure (17) of a corresponding covering element (15).

15. The car (1) according to claim 1, wherein:
the outer cover (16) of each covering element (15) is made of a moulded plastic material; and
the support structure (17) of each covering element (15) is made of a metal material.

* * * * *